(12) United States Patent
Maekawa

(10) Patent No.: US 8,867,067 B2
(45) Date of Patent: Oct. 21, 2014

(54) CONTROLLING DEVICE AND COMPUTER PROGRAM FOR CONTROLLING DEVICE

(75) Inventor: Yohei Maekawa, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 874 days.

(21) Appl. No.: 12/891,418

(22) Filed: Sep. 27, 2010

(65) Prior Publication Data

US 2011/0075209 A1 Mar. 31, 2011

(30) Foreign Application Priority Data

Sep. 28, 2009 (JP) .................................. 2009-223517

(51) Int. Cl.
- G06F 15/00 (2006.01)
- H04N 1/327 (2006.01)
- H04N 1/00 (2006.01)
- G06F 9/44 (2006.01)
- H04N 1/32 (2006.01)

(52) U.S. Cl.
CPC .... *H04N 1/00204* (2013.01); *H04N 2201/3278* (2013.01); *H04N 1/32789* (2013.01);

(Continued)

(58) Field of Classification Search
CPC ................ G06F 3/1204; G06F 3/1288; G06F 17/30905; G06F 3/1205; G06F 3/126; G06F 21/608; G06F 2221/2111; G06F 3/1203; G06F 3/1215; G06F 3/1222; G06F 3/1226; G06F 3/1228; G06F 3/1229; G06F 3/1232; G06F 3/124; G06F 3/1257; G06F 3/1265; H04N 2201/0086; H04N 1/00209; H04N 1/00212; H04N 1/00222; H04N 1/00236; H04N 1/00278; H04N 1/00891; H04N 1/00925; H04N 1/00973; H04N 1/32416; H04N 1/32507; H04N 1/32512; H04N 1/32529; H04N 1/32683; H04N 1/32771

USPC ............................. 358/1.15, 1.1, 1.9; 370/338
See application file for complete search history.

(56) References Cited

U.S. PATENT DOCUMENTS

2003/0123082 A1* 7/2003 Hall et al. ..................... 358/1.15
2006/0126585 A1* 6/2006 Kim .............................. 370/338

(Continued)

FOREIGN PATENT DOCUMENTS

| CN | 1791044 A | 6/2006 |
|----|-----------|--------|
| CN | 1943170 A | 4/2007 |

(Continued)

OTHER PUBLICATIONS

State Intellectual Property Office of the People's Republic of China, Notification of First Office Action, Application No. 201010297355.3 (counterpart to above-captioned patent application), dispatched Mar. 6, 2013.

(Continued)

*Primary Examiner* — King Poon
*Assistant Examiner* — Iriana Cruz
(74) *Attorney, Agent, or Firm* — Merchant & Gould PC

(57) ABSTRACT

A controlling device may be configured to perform a wireless setting process for connecting a target wireless printer to a wireless network according to an automatic wireless setting mode, acquire unique identification information of the target wireless printer from the target wireless printer by performing a communication without usage of an IP layer when the wireless setting process is performed, acquire one or more unique identification information of one or more printers from the one or more printers by performing a communication with usage of the IP layer after an IP address has been set to the target wireless printer, determine a specific printer among the one or more printers as the target wireless printer, generate a print port, which is different from a WSD port, for the specific printer determined as the target wireless printer, and install a printer driver for the specific printer.

12 Claims, 3 Drawing Sheets

(52) U.S. Cl.
CPC .... *H04N 1/32117* (2013.01); *H04N 2201/3208* (2013.01); *H04N 2201/0039* (2013.01); H04N 1/32702 (2013.01); G06F 9/4411 (2013.01); *H04N 2201/0082* (2013.01); *H04N 2201/0055* (2013.01); *H04N 2201/0036* (2013.01); H04N 1/32797 (2013.01)
USPC ..................................... 358/1.15; 348/207.2

(56) References Cited

U.S. PATENT DOCUMENTS

| | | | | |
|---|---|---|---|---|
| 2008/0261640 | A1* | 10/2008 | Yoshida | .................. 455/517 |
| 2009/0158301 | A1 | 6/2009 | Holan | |
| 2009/0296145 | A1* | 12/2009 | Nonaka | .................. 358/1.15 |

FOREIGN PATENT DOCUMENTS

| | | |
|---|---|---|
| JP | 2004-013662 A | 1/2004 |
| JP | 2005-064551 A | 3/2005 |
| JP | 2006-338358 A | 12/2006 |
| JP | 2009-015408 A | 1/2009 |
| JP | 2009-089230 A | 4/2009 |

OTHER PUBLICATIONS

Japan Patent Office, Notification of Reasons for Refusal for Japanese Patent Application No. 2009-223517 (counterpart to above-captioned patent application), dispatched Mar. 19, 2013.

Roth, Dave, "Unifying the Wireless and Network Device Installation Experience in Windows 7," WinHEC 2008 Advancing the Platform, 2008, available at: http://download.microsoft.com/download/8/6/A/86A97515-8AF4-4CA6-B516-CDA1139B8D93/CON-T576_en.pptx.

Chinese Office Action (Second) issued in CN 201010297355.3 mailed Jan. 3, 2014.

European Office Action issued in EP 10 007 941.7 mailed Feb. 14, 2014.

Chinese Office Action issued in CN 201010297355.3, mailed Jul. 10, 2014.

* cited by examiner

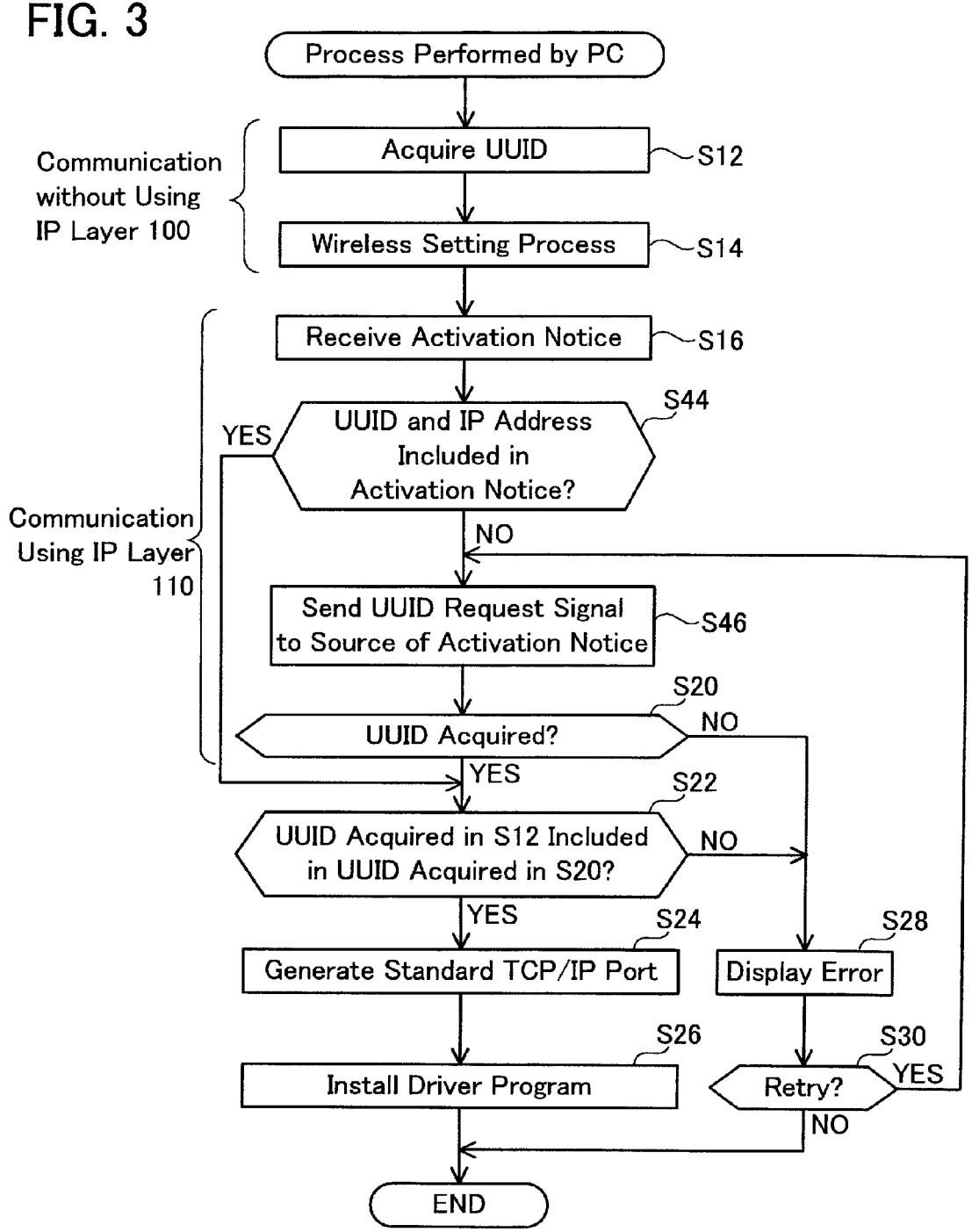

CONTROLLING DEVICE AND COMPUTER PROGRAM FOR CONTROLLING DEVICE

CROSS-REFERENCE TO RELATED APPLICATIONS

This application claims priority to Japanese Patent Application No. 2009-223517, filed on Sep. 28, 2009, the contents of which are hereby incorporated by reference into the present application.

TECHNICAL FIELD

The present specification discloses a controlling device for causing a target wireless printer having a wireless communication function to perform print.

DESCRIPTION OF RELATED ART

Technology referred to as Vertical Pairing is being proposed. With the Vertical Pairing, a controlling device performs a wireless setting process for connecting a target wireless printer to a wireless network according to an automatic wireless setting mode, and subsequently performs a process of installing a printer driver for the target wireless printer. Of the foregoing sequence of processes, the target wireless printer becomes connectable to the wireless network as a result of the former process, and the controlling device becomes capable of sending a print command to the target wireless printer via the wireless network as a result of the latter process. The controlling device is thereby able to cause the target wireless printer to perform printing.

SUMMARY

Meanwhile, in a case where the printer driver is installed in the controlling device based on the Vertical Pairing technology, information concerning the controlling device to which the printer driver has been installed may be registered in the wireless printer. Thus, in a case where the printer driver is installed e.g. in a plurality of controlling devices, information concerning the plurality of controlling devices may be registered in the wireless printer. Since the storage capacity of the memory in the wireless printer is limited, increase in the amount of information to be stored in the wireless printer is undesirable. The present specification provides technology for inhibiting the increase in the amount of information to be stored in the wireless printer.

This specification discloses a controlling device for causing a target wireless printer having a wireless communication function to perform printing. This controlling device may comprise a setting unit, a first acquiring unit, a second acquiring unit, a determining unit and an installing unit. The setting unit may be configured to perform a wireless setting process for connecting the target wireless printer to a wireless network according to an automatic wireless setting mode. The first acquiring unit may be configured to acquire, by performing a communication without usage of an IP layer when the wireless setting process is performed, unique identification information of the target wireless printer from the target wireless printer. The second acquiring unit may be configured to acquire, by performing a communication with usage of the IP layer after an IP address has been set to the target wireless printer, one or more unique identification information of one or more printers from the one or more printers that are capable of communicating with the controlling device via a network. The determining unit may be configured to determine a specific printer among the one or more printers as the target wireless printer, based on the unique identification information of the target wireless printer acquired by the first acquiring unit and the one or more unique identification information of the one or more printers acquired by the second acquiring unit, wherein the specific printer has the unique identification information of the target wireless printer. The installing unit may be configured to generate a print port, which is different from a WSD port, for the specific printer determined as the target wireless printer and install a printer driver for the specific printer.

Incidentally, the control method, computer program and non-transitory recording medium storing such computer program for realizing the controlling device are also novel and useful. Moreover, the system comprising the controlling device and the wireless printer is also novel and useful.

BRIEF DESCRIPTION OF THE DRAWINGS

FIG. 3 shows a flowchart of processes to be performed by a PC of the second embodiment.

EMBODIMENT (First Embodiment)
(Configuration of Wireless Communication System 2)

Figure 1:
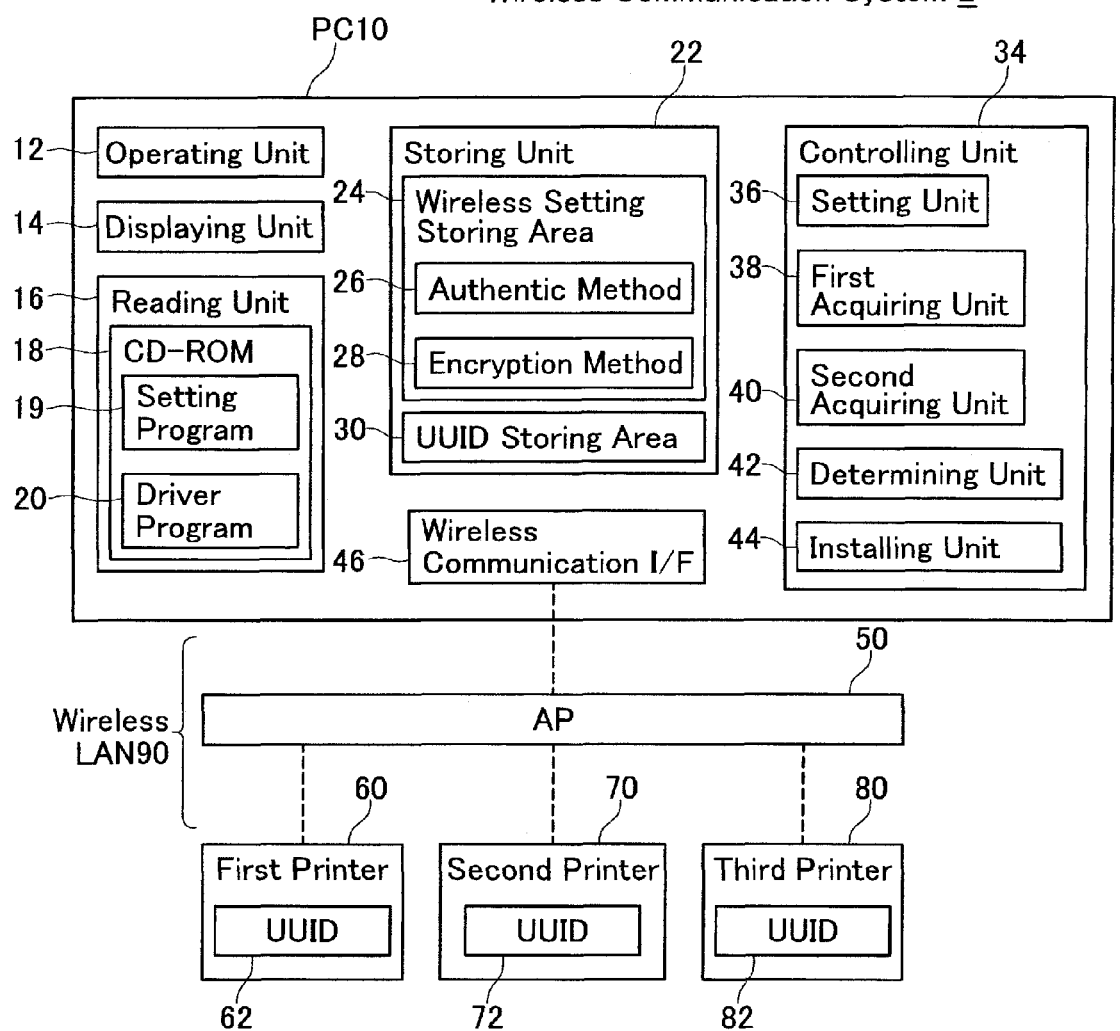
FIG. 1 shows a schematic configuration of a wireless communication system.

The first embodiment is explained with reference to drawings. Referring to FIG. 1, a wireless communication system 2 comprises a PC 10, a wireless LAN 90 and a plurality of printers 60, 70, 80. The wireless LAN 90 includes an access point (abbreviated as "AP" in the drawings and the ensuing explanation) 50. The PC 10, the second printer 70 and the third printer 80 are connected to the wireless LAN 90. Specifically, the respective devices 10, 70, 80 may communicate with the AP 50 using the wireless communication method that is currently being used by the wireless LAN 90. There is no limitation in the number of PCs and printers that the wireless communication system 2 may comprise. The first printer 60 is connected to the wireless LAN 90 according to the process explained later to be performed by the PC 10. The respective printers 60, 70, 80 have unique UUIDs 62, 72, 82.

(Configuration of PC 10)

The PC 10 comprises an operating unit 12, a displaying unit 14, a reading unit 16, a storing unit 22, a controlling unit 34, a wireless communication interface (abbreviated as "wireless communication I/F" in the drawings and the ensuing explanation) 46, and so on.

The operating unit 12 is configured from a keyboard and a mouse. A user is able to cause the PC 10 to perform various processes by operating the operating unit 12. The displaying unit 14 is a display for displaying various types of information. The reading unit 16 reads programs, data and the like that are stored in a non-transitory information storage medium (CD-ROM 18 in this embodiment). The CD-ROM 18 is an information storage medium that is manufactured by a manufacturer of the first printer 60. The CD-ROM 18 is packaged together with the first printer 60 when the first printer 60 is shipped. The CD-ROM 18 includes a setting program 19 and a driver program 20. The setting program 19 is a program for causing the controlling unit 34 described later to perform the wireless setting process for the first printer 60, the installation process of the driver program 20, and other processes. The driver program 20 is a program for causing the PC 10 to function as a printer driver for the first printer 60. In a case where the driver program 20 is installed in the PC 10, the PC 10 may cause the first printer 60 to perform printing according to the driver program 20.

The controlling unit 34 is configured from a CPU not shown. The controlling unit 34 performs various processes according to the setting program 19 stored in the CD-ROM 18. The functions of the respective units 36 to 44 are realized by the controlling unit 34 performing the processes according to the setting program 19.

The storing unit 22 comprises a wireless setting storing area 24, a UUID storing area 30, and so on. The wireless setting storing area 24 stores wireless communication methods (authentic method 26 and encryption method 28). The wireless communication methods 26, 28 stored in the wireless setting storing area 24 are the wireless communication methods that are currently being used by the wireless LAN 90. The UUID storing area 30 is an area for temporarily storing the UUID acquired from an external device (e.g., the first printer 60) upon the controlling unit 34 performing the processes. The wireless setting I/F 46 is an interface for conducting wireless communication with an external device (e.g., the AP 50).

(Processes to be Performed by PC 10)

The processes to be performed by the PC 10 are explained in detail. The PC 10 successively performs the wireless setting process for connecting the first printer 60 to the wireless LAN 90, and the process of installing the driver program 20 for the first printer 60. Specifically, the controlling unit 34 of the PC 10 foremost performs the wireless setting process when predetermined operations are performed by the user for starting the process. Even if operations for starting the installation of the driver program 20 are not performed, the controlling unit 34 performs the process of installing the driver program 20 subsequent to the wireless setting process.

Figure 2:
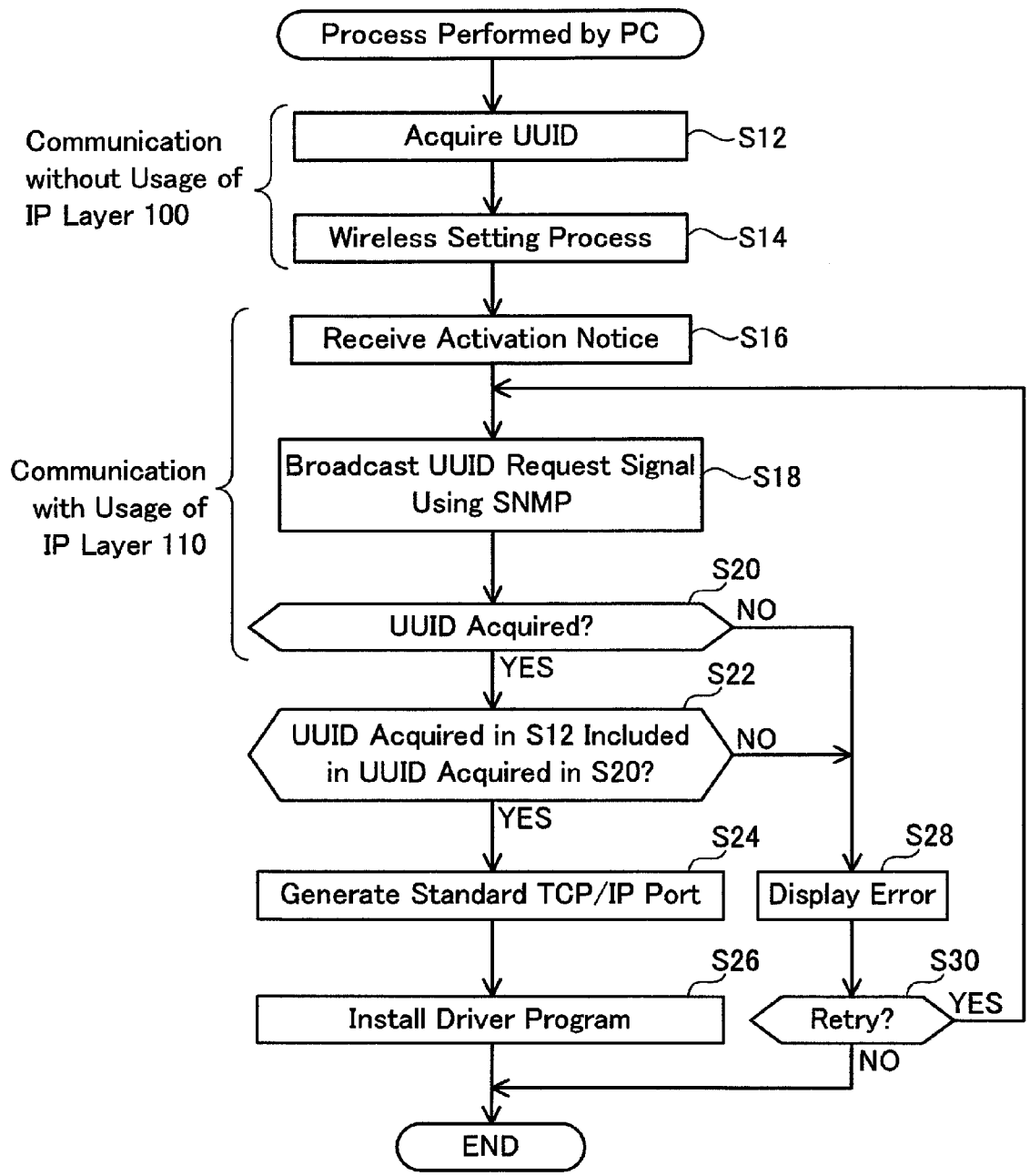
FIG. 2 shows a flowchart of processes to be performed by a PC of the first embodiment.

As shown in FIG. 2, when the user operates the automatic wireless setting button (not shown) of the operating unit 12, the controlling unit 34 of the PC 10 performs processes of S12 and S14 according to WPS (WPS (Wi-Fi Protected Setup) formulated according to the Wi-Fi alliance). The WPS push button system is used in this embodiment. Communication without usage of the IP layer; i.e., communication that uses a layer (e.g., a data link layer) that is lower than the IP layer is performed in the processes of S12 and S14. In S12, the first acquiring unit 38 receives a Probe Request that is sent from the first printer 60. The Probe Request that is sent from the first printer 60 contains the UUID 62 of the first printer 60. In S12, the first acquiring unit 38 acquires the UUID 62 contained in the Probe Request. The first acquiring unit 38 temporarily stores the acquired UUID 62 in the UUID storing area 30.

In S14, the setting unit 36 performs the wireless setting process. In S14, the setting unit 36 foremost sends a Probe Response, which is the response to the Probe Request, to the first printer 60. The setting unit 36 thereafter sends the wireless communication methods (authentic method 26 and encryption method 28) stored in the wireless setting storing area 24 to the first printer 60.

The first printer 60 stores the wireless communication methods 26, 28 sent from the PC 10 in a predetermined storing area. Consequently, the first printer 60 may communicate with the AP 50 based on the wireless communication methods 26, 28. Specifically, the first printer 60 becomes connectable to the wireless LAN 90. In order for the first printer 60 to be connected to the wireless LAN 90 and communicate data with another device (e.g., the PC 10) that is connected to the wireless LAN 90, an IP address must be set in the first printer 60. An IP address is assigned to the first printer 60 from the AP 50 having a DHCP (Dynamic Host Configuration Protocol) server function. The first printer 60 sets the IP address that was assigned from the AP 50 as its own IP address.

When the IP address is set, the first printer 60 broadcasts an activation notice. The activation notice of this embodiment is a WS-Discovery (Web Services Dynamic Discovery) activation notice. The activation notice is sent to the respective devices (e.g., the PC 10 and the printers 70, 80) that are connected to the wireless LAN 90 via the AP 50. Consequently, the PC 10 receives the activation notice (S16). In addition to the foregoing timing, the first printer 60 also broadcasts the activation notice when its power is turned ON. In addition, each of the printers 70, 80 also broadcasts the activation notice each time the power is turned ON (when the power is turned ON and its IP address is set). Thus, there may be cases where the PC 10 additionally receives the activation notice(s) from the printers 70, 80 at the timing of receiving the activation notice from the first printer 60.

When the controlling unit 34 receives the activation notice from the first printer 60 (S16), it subsequently starts the process of installing the driver program 20. In this process, the installing unit 44 of the PC 10 generates a Standard TCP/IP port to which the IP address of the first printer 60 is designated, and installs the driver program 20 in the PC 10. The first printer 60 broadcasts the activation notice with usage of the IP layer (i.e., a communication with usage of the IP layer 110 is performed). Specifically, an IP address of the first printer 60 is contained in the activation notice that was broadcast from the first printer 60. Accordingly, the installing unit 44 may generate the Standard TCP/IP port by using the IP address of the first printer 60 contained in the activation notice that was received from the first printer 60. Nevertheless, as described above, when the PC 10 is to receive activation notices from a plurality of printers in S16, the controlling unit 34 is unable to identify the activation notice that was broadcast from the first printer 60 among the plurality of activation notices. Thus, the installing unit 44 is unable to determine which IP address contained in which activation notice among the plurality of activation notices should be used to generate the Standard TCP/IP port. In this process, the controlling unit 34 may identify the IP address of the first printer 60 by performing the following processes of S18 to S22.

Specifically, the second acquiring unit 40 broadcasts a request signal for requesting the UUID of the respective devices (S18). The second acquiring unit 40 uses the SNMP to broadcast the request signal. The request signal is sent to the respective printers 60, 70, 80 via the wireless LAN 90. The second acquiring unit 40 monitors the reception of a response signal in response to the request signal until a predetermined time lapses after broadcasting the request signal (S20). Incidentally, the communication 110 with usage of the IP layer is conducted in the processes of S18 and S20.

If a response signal in response to the request signal is not received before the lapse of the foregoing predetermined time, the determination is NO at S20, and the routine proceeds to S28. In this embodiment, each of the three printers 60, 70, 80 sends a response signal containing the UUID of the relevant printer. Each response signal contains the IP address of each printer 60, 70, 80. The second acquiring unit 40 thereby acquires the three UUIDs 62, 72, 82 and the three IP addresses that are set in the three printers 60, 70, 80. In this case, the determination is YES at S20, and the routine proceeds to S22. In S22, the determining unit 42 determines whether the same UUID as the UUID 62 that was stored in the UUID storing area 30 in S12 is included in the UUIDs 62, 72, 82 that were acquired through the communication with usage of the IP layer 110 in S20 (S22).

If the determination is YES at S22, the determining unit 42 determines, among the three printers 60, 70, 80 to which the three UUIDs 62, 72, 82 acquired in S20 are set, the first printer 60, to which the UUID 62 stored in the UUID storing area 30 is set as the target device corresponding to the driver program 20. In this case, the installing unit 44 generates a Standard TCP/IP port in the storing unit 22 by using the IP address of the first printer 60 that is contained in the response signal from the first printer 60 acquired at S20 (S24). The installing unit 44 thereby may generate a Standard TCP/IP port to which the IP address of the first printer 60 is designated. Incidentally, the Standard TCP/IP port includes an LPR (Liner Printer Daemon Protocol) port and a RAW port.

The installing unit 44 subsequently stores the driver program 20 stored in the CD-ROM 18 that was set in the reading unit 16 in a predetermined storing area within the storing unit 22 (S26). The driver program 20 is thereby installed in the PC 10. When the installation of the driver program 20 is complete, the controlling unit 34 erases the UUID 62 from the UUID storing area 30.

Meanwhile, if the determination is NO in S22, the routine proceeds to S28. In S28, the controlling unit 34 displays on the displaying unit 14 an error message indicating that a UUID identical to the UUID 62 stored in the UUID storing area 30 cannot be acquired. The controlling unit 34 subsequently displays on the displaying unit 14 a message (character string indicating "retry" and character string indicating "cancel") for enhancing the user to select whether to retry the acquisition of the UUID. The controlling unit 34 monitors the user's selection (S30). If the user selects "retry" (YES in S30), the routine returns to S18. Meanwhile, if the user selects "cancel" or the user makes no selection even after a lapse of a predetermined time after the message is displayed on the displaying unit 14 (NO in S30), the process is ended. If the determination is NO in S30, the controlling unit 34 erases the UUID 62 from the UUID storing area 30.

The PC 10 of this embodiment was explained in detail above. In a case where the PC 10 is to generate e.g. a WSD port as the print port for the first printer 60, the first printer 60 needs to store information concerning the PC 10 such as the UUID of the PC 10. Thus, the amount of information to be stored in the first printer 60 will increase. Meanwhile, in this embodiment, the PC 10 generates, as the print port for the first printer 60, a Standard TCP/IP port that is a different print port from the WSD port. Consequently, the first printer 60 is not required to store information concerning the PC 10 such as the UUID of the PC 10. In particular, in a system where a plurality of devices (e.g., a plurality of PCs 10) installs the driver program 20 of the first printer 60, the first printer 60 is not required to store the UUID and the like of the plurality of PCs 10. Thus, it is possible to inhibit the increase in the amount of information to be stored in the first printer 60.

Moreover, the second acquiring unit 40 of the PC 10 uses the SNMP and broadcasts the UUID request signal to the devices connected to the wireless LAN 90. Thus, the PC 10 may acquire the UUID 62 of the first printer 60 by conducting the communication 110 with usage of the IP layer without having to know the IP address that is set in the first printer 60.

(Second Embodiment)

The point that is different from the first embodiment is explained. In the second embodiment, the PC 10 determines whether the activation notice received from the first printer 60 contains the UUID of the first printer 60. This point differs from the first embodiment.

FIG. 3 shows a flowchart of processes to be performed by the PC 10 of this embodiment. In FIG. 3, the same processes as FIG. 2 are given the same reference numeral as FIG. 2.

As explained above, after an IP address is set to the first printer 60 and the wireless communication methods 26, 28 are set to the first printer 60, the first printer 60 broadcasts an activation notice which at least contains the IP address that is set to itself. The second acquiring unit 40 of the PC 10 receives the activation notice sent from the first printer 60 (S16). The second acquiring unit 40 determines whether the activation notice received at S16 contains a UUID (S44). If the determination is YES in S44, the routine proceeds to S22. If the determination is NO in S44, the second acquiring unit 40 sends a request signal for requesting a UUID to the IP address contained in the activation notice as the destination (S46), and then the routine proceeds to S20. The foregoing processes of S44 to S46 are performed through the communication 110 with usage of the IP layer.

In the second embodiment, in a case where the first printer 60 is to send an activation notice containing its own UUID 62, the PC 10 determines YES in S44. In this case, the PC 10 is not required to perform the communication of S46 in order to acquire the UUID. It is thereby possible to reduce the communication load of the wireless LAN 90. In addition, if the activation notice sent from the first printer 60 does not contain the UUID of the first printer 60, the PC 10 may acquire the UUID 62 of the first printer 60 by sending a request signal for requesting the UUID to the first printer 60.

Incidentally, the PC 10 is an example of the "controlling device," and the first printer 60 is an example of the "target wireless printer" and the "specific printer." The UUID is an example of the "unique identification information." In addition, a MAC address may be used as the "unique identification information" in substitute for the UUID. In the first embodiment, the three printers 60, 70, 80 are an example of the "one or more printers," and in the second embodiment, the first printer 60 is an example of the "one or more printers." Moreover, the wireless LAN 90 is an example of the "wireless network" and the "network."

MODIFIED EXAMPLES (1) In each of the foregoing embodiments, the PC 10 is wirelessly connected to the AP 50. However, as an alternative, the PC 10 may also be wiredly connected to the AP 50. As another alternative, the PC 10 and the AP 50 may be configured integrally. Moreover, the PC 10 may be connected to the second and third printers 70, 80 via a wired network. In this case, the second acquiring unit 40 of the PC 10 may acquire the UUIDs 72, 82 of the second and third printers 70, 80 via the wired network. In this modified example, the wireless LAN 90 and the wired network are examples of the "network."

(2) The foregoing activation notice is not limited to those using WS-Discovery. The activation notice may alternatively be another packet to be used by a device, upon connecting to a network, for notifying the other devices connected to the network that it will be connected to the network. For example, the activation notice may be a Bonjour packet using mDNS (Multicast Domain Name System) or a Hello packet using SSDP (Simple Service Discovery Protocol).

(3) In each of the foregoing embodiments, a WPS push button system is used for performing the automatic wireless setting. However, as an alternative, a WPS PIN code system may also be used.

(4) In each of the foregoing embodiments, the first printer 60 acquires the IP address to be set to itself from the AP 50.

Nevertheless, the user of the first printer 60 may also input the IP address to be set in the first printer 60 into the first printer 60. In this case, the first printer 60 may also set the IP address that was input by the user as its own IP address. The first printer 60 may broadcast the activation notice upon setting the IP address that was input by the user as its own IP address.

(5) In each of the foregoing embodiments, the first acquiring unit 38 of the PC 10 acquires the UUID 62 contained in the Probe Request sent from the first printer 60. Nevertheless, the first acquiring unit 38 may also acquire a response signal containing the UUID 62 of the first printer 60 by sending a request signal for requesting the UUID to the first printer 60.

(6) Each of the foregoing printers 60, 70, 80 may also be a multifunctional device comprising a scan function, a FAX communication function and the like in addition to the print function.

(7) In the foregoing embodiment, respective units 36 to 44 are realized as a result of the controlling unit 28 performing the processes according to the program 26. Nevertheless, at least one unit of respective units 36 to 44 may alternately be realized by a hardware resource such as a logic circuit.

The invention claimed is:

1. A controlling device for causing a target wireless printer having a wireless communication function to perform printing, the controlling device comprising:
   a setting unit configured to perform a wireless setting process for connecting the target wireless printer to a wireless network according to an automatic wireless setting mode;
   a first acquiring unit configured to acquire, by performing a communication with usage of a layer that is lower than an IP layer when the wireless setting process is performed, unique identification information of the target wireless printer from the target wireless printer;
   a second acquiring unit configured to acquire, by performing a communication with usage of the IP layer after an IP address has been set to the target wireless printer, one or more unique identification information of one or more printers from the one or more printers that are capable of communicating with the controlling device via a network;
   a determining unit configured to determine whether the same unique identification information as the unique identification information acquired by the first acquiring unit is included in the one or more unique identification information acquired by the second acquiring unit, and determine a specific printer, which has the same unique identification information as the unique identification information acquired by the first acquiring unit, among the one or more printers as the target wireless printer in a case where it is determined that the same unique identification information as the unique identification information acquired by the first acquiring unit is included in the one or more unique identification information by the second acquiring unit; and
   an installing unit configured to generate a print port, which is different from a WSD port, for the specific printer determined as the target wireless printer and install a printer driver for the specific printer.

2. The controlling device as in claim 1, wherein
the second acquiring unit is configured to broadcast a predetermined signal with usage of an SNMP so as to receive one or more response signals from the one or more printers, and is configured to acquire the one or more unique identification information included in the one or more response signals.

3. The controlling device as in claim 1, wherein
the second acquiring unit is configured to acquire the one or more unique identification information after receiving one or more activation notices that are sent from the one or more printers when the one or more printers start to connect with the network.

4. The controlling device as in claim 1, wherein
the second acquiring unit is configured to receive one or more activation notices that are sent from the one or more printers when the one or more printers start to connect with the network, and is configured to acquire the one or more unique identification information included in the one or more activation notices.

5. The controlling device as in claim 1, wherein
the print port includes a Standard TCP/IP port.

6. The controlling device as in claim 1, wherein
the second acquiring unit is configured to acquire, along with the one or more unique identification information, one or more IP addresses that have been set to the one or more printers from the one or more printers, and
the installing unit is configured to generate the print port with usage of an IP address that has been set to the specific printer determined as the target wireless printer.

7. A non-transitory computer readable medium including computer program for a controlling device for causing a target wireless printer with a wireless communication function to perform printing,
   the computer program including instructions for ordering a computer mounted on the controlling device to perform:
   performing a wireless setting process for connecting the target wireless printer to a wireless network according to an automatic wireless setting mode;
   acquiring, by performing a communication with usage of a layer that is lower than an IP layer when the wireless setting process is performed, unique identification information of the target wireless printer from the target wireless printer;
   acquiring, by performing a communication with usage of the IP layer after an IP address has been set to the target wireless printer, one or more unique identification information of one or more printers from the one or more printers that are capable of communicating with the controlling device via a network;
   determining whether the same unique identification information as the unique identification information acquired by performing the communication with usage of the layer that is lower than the IP layer is included in the one or more unique identification information acquired by performing the communication with usage of the IP layer, and determine a specific printer, which has the same unique identification information as the unique identification information acquired by performing the communication with usage of the layer that is lower than the IP layer, among the one or more printers as the target wireless printer in a case where it is determined that the same unique identification information as the unique identification information acquired by performing the communication with usage of the layer that is lower than the IP layer is included in the one or more unique identification information by performing the communication with usage of the IP layer; and
   generating a print port, which is different from a WSD port, for the specific printer determined as the target wireless printer and installing a printer driver for the specific printer.

8. A controlling device comprising:
a wireless network interface configured to be connected to a wireless network;
a computer coupled to the wireless network interface; and
a memory storing computer program including instructions that, when executed by the computer, cause the controlling device to:
perform a wireless setting process according to an automatic wireless setting mode and connect the target wireless printer to the wireless network;
communicate with the target wireless printer via the wireless network by using a particular layer lower than an IP layer;
acquire particular unique identification information of the target wireless printer from the target wireless printer while communicating with the target wireless printer by using the particular layer;
after an IP address has been set to the target wireless printer, communicate with the target wireless printer via the wireless network by using the IP layer;
acquire at least one unique identification information from at least one printer, each of the at least one unique identification information being assigned to each of the at least one printer respectively, each of the at least one printer being capable of communicating with the controlling device via the wireless network;
determine whether each of the at least one unique identification information is identical to the acquired particular unique identification information;
in response to determination that one of the at least one unique identification information is identical to the acquired particular unique identification information, determine a specific printer among the at least one printer as the target wireless printer, the specific printer being identified by the one of the at least one unique identification information;
generate a print port in the controlling device for the specific printer determined as the target wireless printer, the print port being different from a WSD port; and
install a printer driver for the specific printer in the controlling device.

9. The controlling device as in claim 8, wherein the instructions further cause the controlling device to:
receive at least one activation notice from the at least one printer in response to connecting the at least one printer to the wireless network, each of the at least one activation notice corresponding to each of the at least one printer respectively; and
acquire the at least one unique identification information in response to receiving the at least one activation notice.

10. The controlling device as in claim 8, wherein the instructions further cause the controlling device to:
receive at least one activation notice from the at least one printer in response to connecting the at least one printer to the wireless network, each of the at least one activation notice corresponding to each of the at least one printer respectively,
wherein each of the at least one the unique identification information is included in each of the at least one activation notice respectively.

11. The controlling device as in claim 8, wherein the print port is a Standard TCP/IP port.

12. The controlling device as in claim 8, wherein the instructions further cause the controlling device to:
in addition to the at least one unique identification information, acquire at least one IP address from the at least one printer, each of the at least one IP address corresponding to each of the at least one unique identification information and each of the at least one printer respectively, and
generate the print port in the controlling device by using one of the at least one IP address that has been set to the specific printer determined as the target wireless printer.

* * * * *